United States Patent [19]
Manor

[11] Patent Number: 5,378,852
[45] Date of Patent: Jan. 3, 1995

[54] TREE AND SHRUB-CLEARING EQUIPMENT MOUNTED ON TRACTOR

[76] Inventor: Gedalyahu Manor, 15, Adam Hacohen Street, Haifa, Israel

[21] Appl. No.: 103,975

[22] Filed: Aug. 9, 1993

[30] Foreign Application Priority Data

Nov. 8, 1992 [IL] Israel .................................... 103671

[51] Int. Cl.⁶ .................. A01G 23/08; B27L 1/00; B02C 18/00
[52] U.S. Cl. ............................. 144/3 D; 56/2; 56/15.2; 144/2 Z; 144/34 R; 144/335; 144/343; 241/101.7
[58] Field of Search ............ 144/2 Z, 3 D, 34 R, 144/335, 336, 343; 56/2, 15.2, 249, 294; 241/101.7

[56] References Cited
U.S. PATENT DOCUMENTS

| | | | |
|---|---|---|---|
| 2,341,486 | 2/1944 | Swertfeger | 144/208 J |
| 2,501,925 | 3/1950 | Yensen et al. | 144/208 J |
| 2,821,216 | 1/1958 | West et al. | 144/208 J |
| 4,019,549 | 4/1977 | Williams | 144/193 A |
| 4,023,604 | 5/1977 | Stodnick | 144/208 J |
| 5,042,727 | 8/1991 | Plante | 144/2 Z |

FOREIGN PATENT DOCUMENTS

| | | | |
|---|---|---|---|
| 604681 | 4/1978 | U.S.S.R. | 144/208 J |
| 655360 | 4/1979 | U.S.S.R. | 144/34 R |

*Primary Examiner*—W. Donald Bray
*Attorney, Agent, or Firm*—Frishauf, Holtz, Goodman & Woodward

[57] ABSTRACT

Tree and/or brush clearing and/or trimming equipment mounted on a tractor includes a rotary cutter provided with blades pivotally mounted on a rotating shaft and enclosed in a cutter housing open towards the plants to be cut. The cutter is mounted at the end of a multi-section arm, which arm is mounted on the tractor by a joint permitting both angular and rotational disposition of the cutter and the cutter housing, permitting both clearing of undergrowth around the tractor and cutting of low-growing branches or the like.

22 Claims, 8 Drawing Sheets

TREE AND SHRUB-CLEARING EQUIPMENT MOUNTED ON TRACTOR

BACKGROUND OF THE INVENTION

The invention relates to tractor-mounted equipment for clearing trees and shrubs and/or trimming areas of underbrush and shrubs, as well as cutting low-growing tree branches, which work otherwise had to be done by hand.

Recent studies have shown that it is possible to provide grazing areas underneath trees in forests or in fields covered with brush by sowing different kinds of fodder seeds which thrive in the shade. Up to now, clearing of forest and brush-covered areas had to be done by hand, a back-breaking, slow and expensive enterprise. In order to avoid this work, large areas of rain forests are nowadays destroyed by fire, in Brazil and Africa, in order to obtain areable land. However, after a few years the soil becomes sterile, due to lack of suitable fertilizers, forcing the farmer to burn additional parts of the forest and to start sowing again. Especially in tropical climates, fodderplants will thrive in the shade of trees, and it is therefore the main object of the invention to provide equipment suitable for a quick and relatively inexpensive way of clearing the ground underneath the trees and in brush-covered fields and to make it suitable for sowing grass and other growth to be consumed by cattle and other livestock.

On the other hand, it will be convenient to clear pastures and forest areas of undergrowth and shrubs in order to prevent forest and field fires, as well as for the purpose of erecting recreation and camping areas, at low cost, by using mechanical equipment, thereby avoiding back-breaking manual work.

It is another object of the invention to mount this type of equipment on a tractor in such a manner that it can be used alternatively for clearing the ground ahead of the tractor, along its side and, by small adjustment, for clearing a way through a tree or shrub growth by cutting low-growing branches as well. The term "branches" is used in this specification and in the claims to designate the portions of trees, shrubs, bushes, hedges, etc., which are cut by equipment of the present invention.

The present invention is also useful for accomplishing similar cutting, clearing and/or trimming in fields, pasture lands and gardens.

It is yet another object of the invention to provide equipment for the above purposes that can be readily handled and serviced, by only semi-skilled workers.

SUMMARY OF THE INVENTION

A first embodiment of the clearing equipment according to the present invention includes a rotary cutter provided with several blades mounted on a rotating shaft which is attached to and mounted on a tractor by an adjustable arm permitting the cutter to be positioned with its shaft in a substantially horizontal state in front of the tractor or along its side at a suitable distance from its wheels or tracks. For the purpose of trimming hedges and trees and of cutting low branches, the cutter axis is adapted to be brought into vertical position with the cutters moving perpendicular to the hedge or tree trunks and cutting branches close to these trunks. The rotary cutter is attached to the end of the adjustable arm which is adapted to position the cutter alternatively to the front or to the side of the tractor body as well as to regulate its height above the forest floor. The cutter is connected to the end of the arm by means of a special joint permitting revolving of the cutter axis from horizontal into vertical position as well as adjusting its angular position relative to the ground. This also provides an adjustable means for trimming hedges, branches or the like.

Rotational motion of the cutter is preferably obtained by an electric or hydraulic motor driving the cutter through a belt or gear drive, while motion of the arm in all required directions and revolving of the rotor axis is preferably obtained by means of hydraulic actuators driven by hydraulic pump means coupled to the tractor engine.

The equipment may be mounted on one of the sides of the tractor, which permits a relatively far reach to the side of the tractor path, but it is understood that it may likewise be attached to the front or rear or other center-line mount of a tractor with similar effect.

In a preferred embodiment, the arm is attached to one side of a tractor by a pivot member permitting angular motion both in vertical and in horizontal directions so as to move the cutter from a lateral position into a frontal position and vice versa, and to adjust its reach from a close to a far distance from its point of attachment. The arm is comprised of at least two sections, a first section attached at its one end to the tractor side and at its other end to the second section, the latter carrying the cutter at its far end by means of said joint. The position of the arm and its sections is adjustable by means of hydraulic actuators and connecting rods, permitting folding of the sections into substantially vertical position for traveling and extending them to their full horizontal length for far reach.

DETAILED DESCRIPTION

FIGS. 1-6 illustrate a tractor and a clearing equipment attached to its side, in various positions to suit various clearing operations. In these drawings, "I" denotes the tractor, "II" hydraulic pumping equipment driven by the tractor's power-take-off from the tractor's engine, "III" the rotating cutter and its housing, and "IV" the movable arm connecting the cutter III to the tractor I. In this connection it is reiterated that the point of attachment of the arm to the right side of the tractor body has been arbitrarily chosen, and that it likewise may be attached to the left side or to the front or center of the tractor, after suitable reinforcement of the attachment point, as will be described later with reference to FIGS. 12-15.

Figure 1:
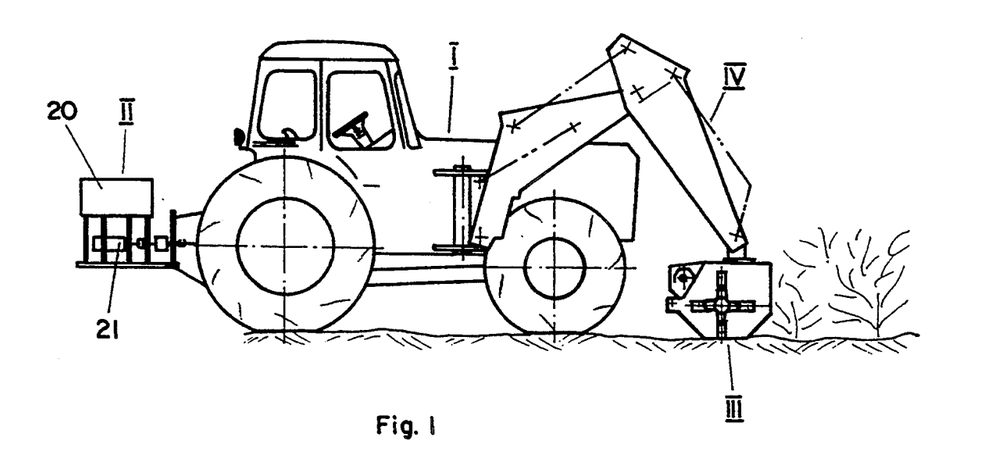
FIG. 1 is a side view of a tractor and the clearing equipment directed towards the tractor's front.
Figure 2:
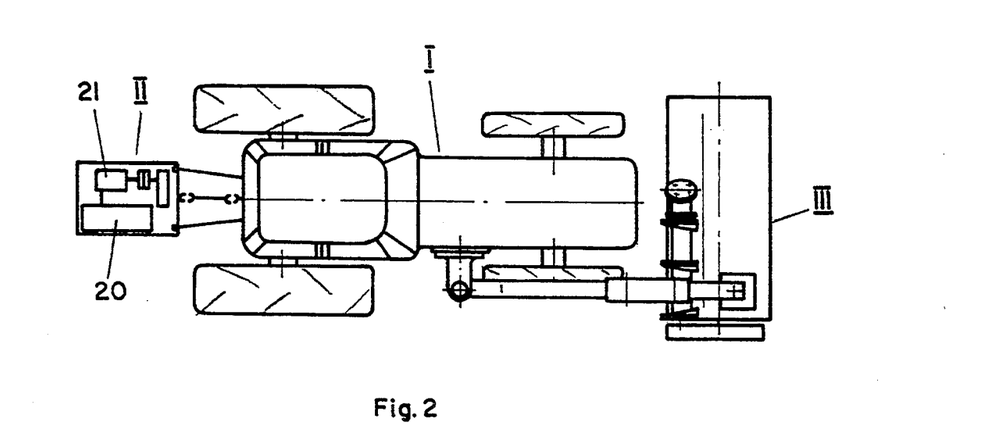
FIG. 2 is a top view of the tractor and equipment of FIG. 1.

FIGS. 1 and 2 illustrate the cutter III in a horizontal position close to the ground and held by the arm IV which extends in a forward direction parallel to the longitudinal axis of the tractor I. In this position, brushwork (shrubs or the like) shown in front of the tractor is cut off and shredded, whereby a broad path is cleared through the trees or bush or shrubs which may be used as a road for transporting timber, or an entire area may be cleared by moving the tractor and the equipment in parallel lines across the ground.

Figure 3:
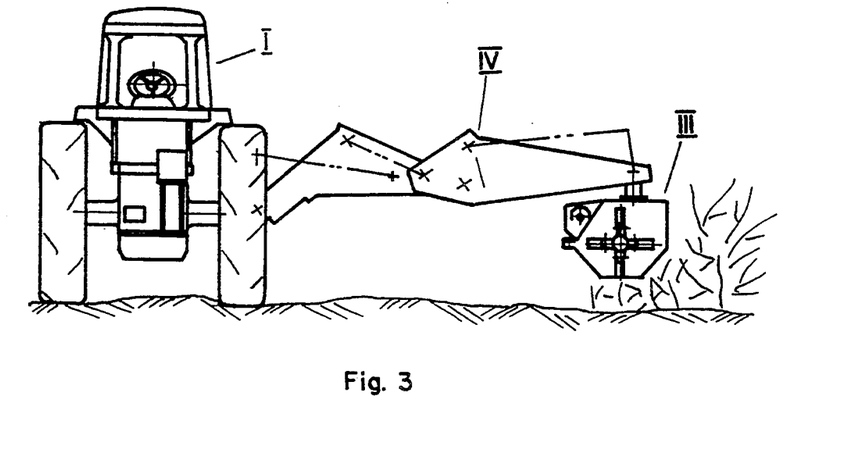
FIG. 3 is a rear view of a tractor and the clearing equipment directed far to the side of the tractor.
Figure 4:
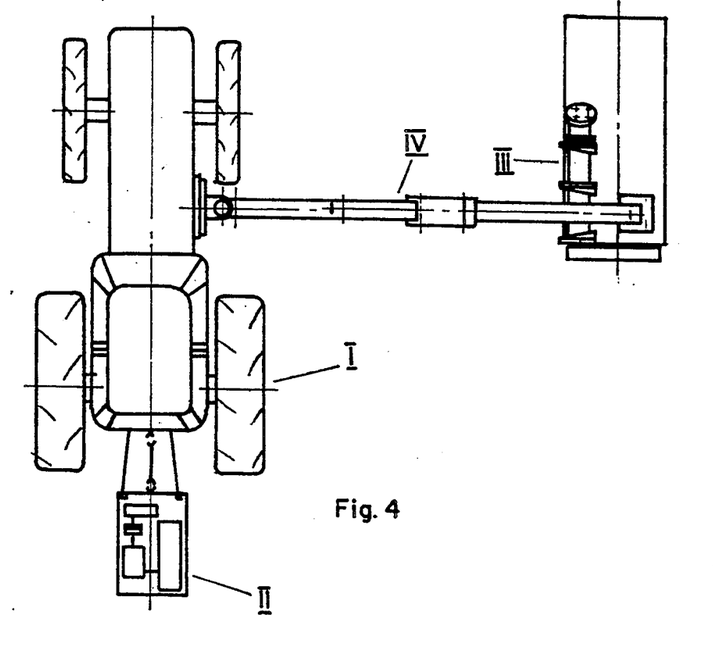
FIG. 4 is a top view of the tractor and equipment of FIG. 3.

FIGS. 3 and 4 illustrate the cutter III far extended to the side of the tractor I with the axis of the cutter III directed in the direction of travel of the tractor I, while clearing brushwork on the side of the tractor which moves along a previously cleared path or road. This operation is used in order to prevent fires on the road sides caused by sparks from passing vehicles, as well as for clearing underbrush growing between closely planted trees or rocks.

Figure 5:
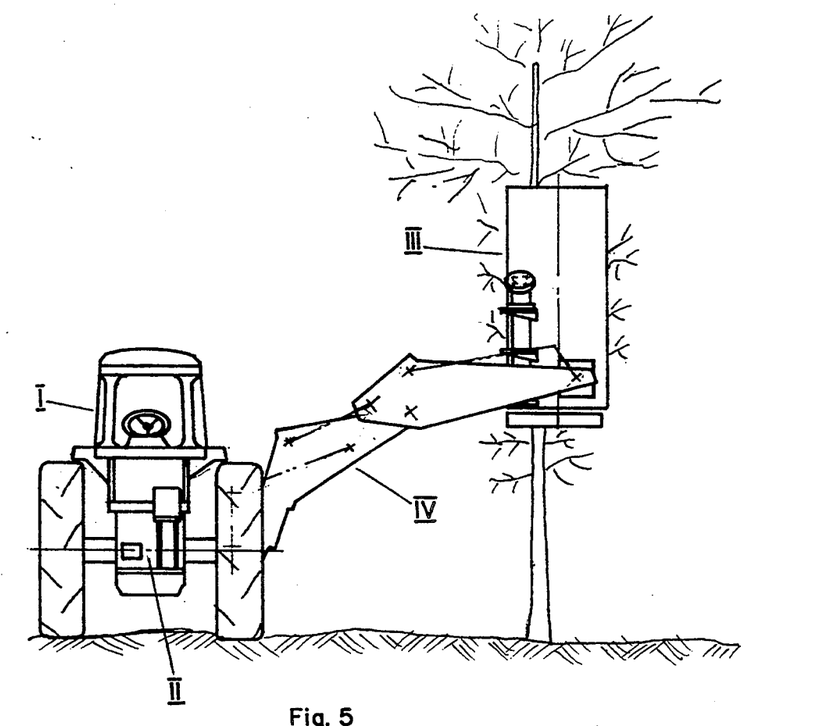
FIG. 5 is a rear view of a tractor and the clearing equipment adjusted for tree-trimming purposes.
Figure 6:
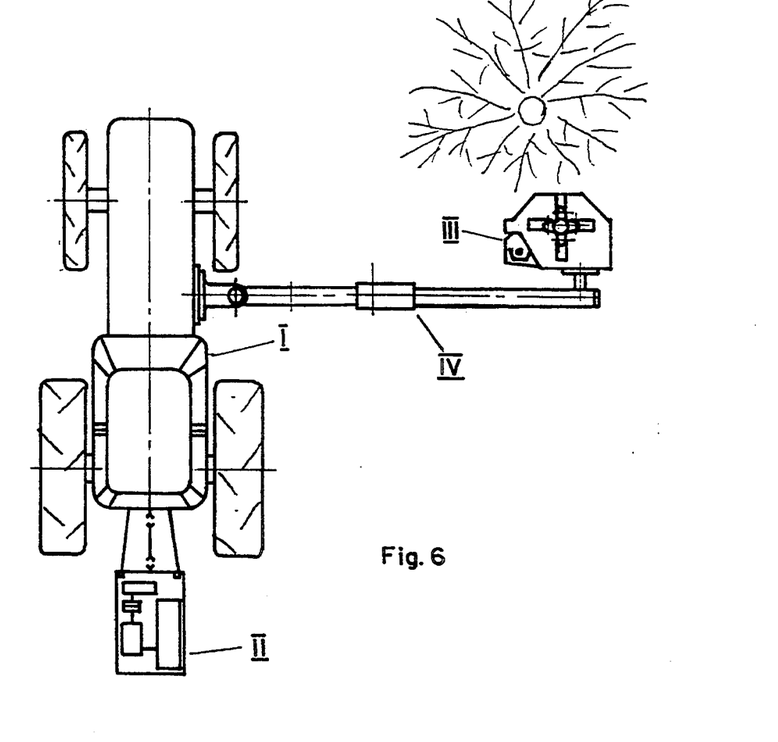
FIG. 6 is a top view of the tractor and equipment of FIG. 5.

FIGS. 5 and 6 illustrate the cutter III mounted in a vertical direction raised to a certain height by the arm IV which is extended at right angles to the direction of travel of the tractor I. In this position the cutter III is used to trim trees and hedges on one or both sides of a road or path on which the tractor I can travel.

Figure 7:
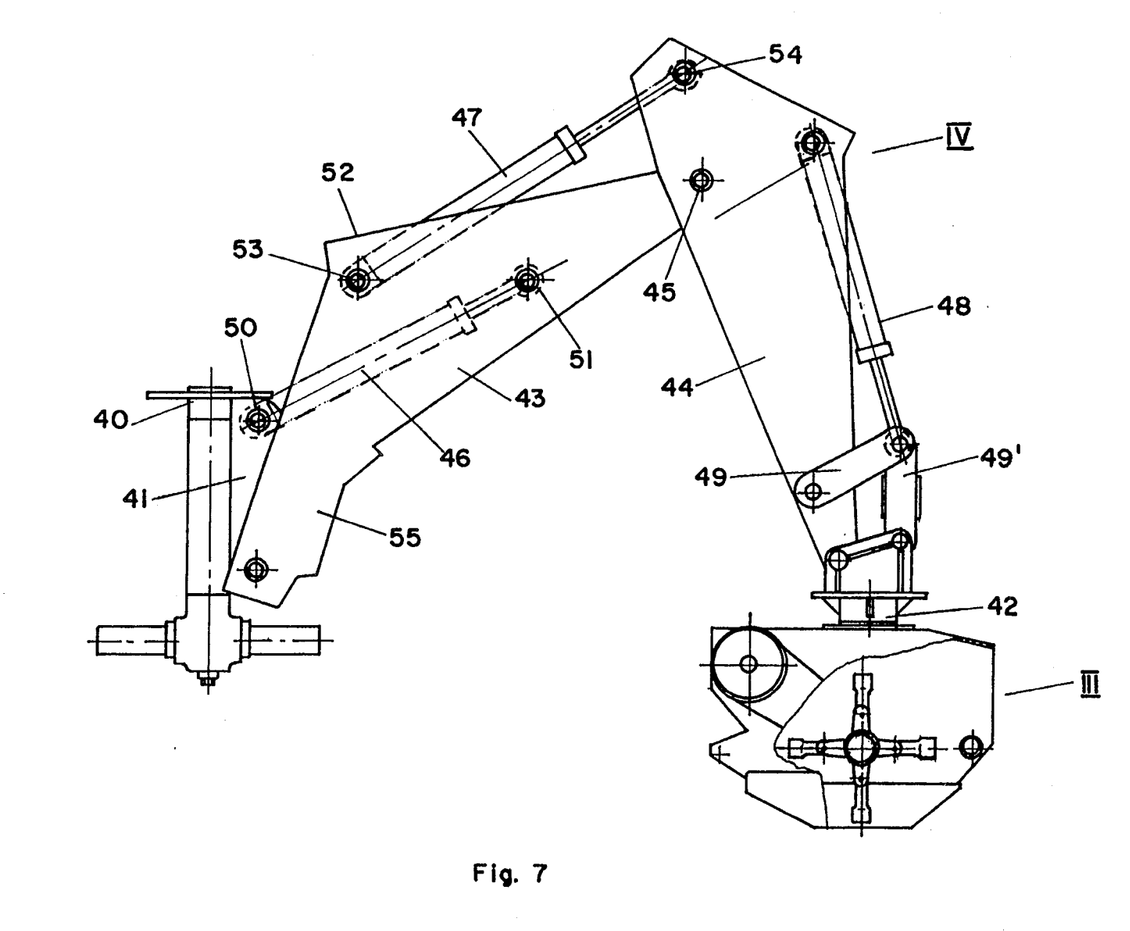
FIG. 7 is a detailed side view of the arm and cutter of the clearing equipment.
Figure 8:
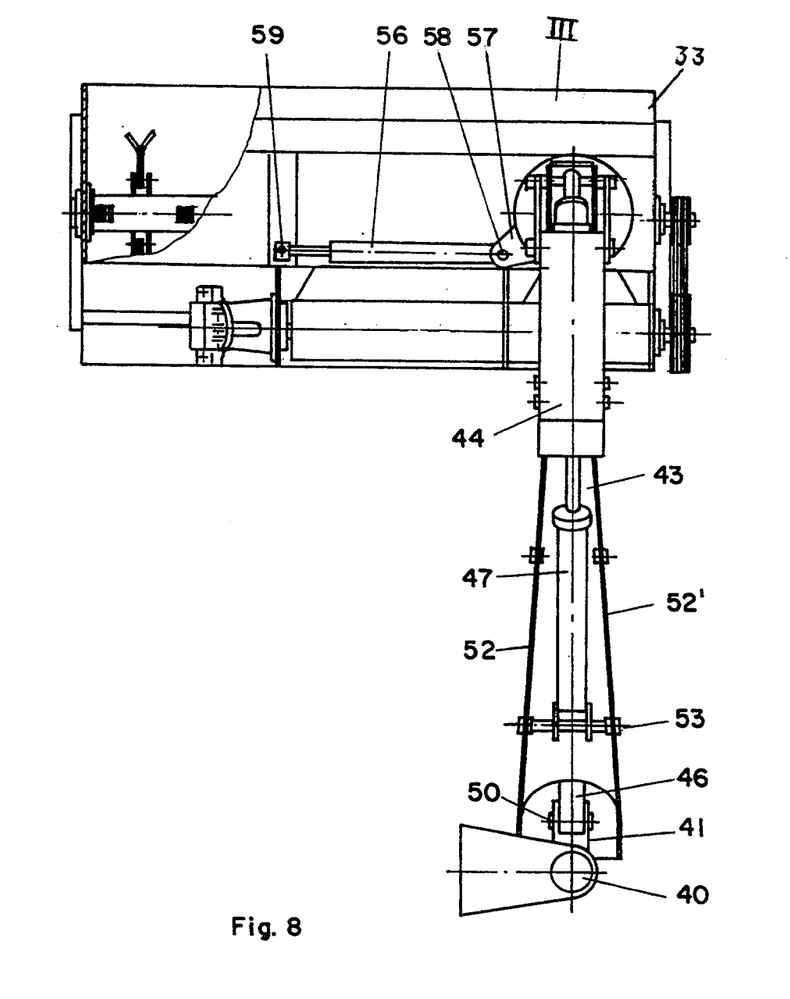
FIG. 8 is a top view of the cutter and of the arm of the equipment shown in FIG. 7.

The clearing equipment as illustrated in FIGS. 7 and 8 is movably attached to the one of the sides or to the front or to the center of a tractor I by means of a vertical axle 40 and a rotatable bracket 41, permitting angular displacement of the equipment to the side or to the front of the tractor. The equipment includes essentially a rotatable cutter III which is attached to the outer end of the arm IV by means of a joint 42 which permits both angular and rotational displacement of the cutter. The arm IV comprises two sections 43 and 44 which are interconnected by a pivot joint 45 and which permits folding of the arm sections 43, 44 so as to locate the cutter close to the tractor body or which permits stretching out of the arm sections 43, 44 so as to place the cutter as far as possible from the tractor body. Arm section 43 is pivotally attached to the lower end of the bracket 41 and is adapted to be swung about this pivot in a vertical plane by a hydraulic actuator 46 which has its near end fastened to the top of bracket 41 by pivot 50 and its far end attached to the arm section 43 by a pivot 51. Section 43 is comprised of two steel sheets 52, 52' (FIG. 8) which also enclose hydraulic actuator 46. Arm section 44 is movable in relation to section 43 by means of a hydraulic actuator 47 which is pivotally connected to arm section 43 by a pivot 53 and to the near end of arm section 44 by a pivot 54. Adjustment of the position of the cutter III relative to the arm section IV is by means of a third hydraulic actuator 48 which actuates the joint 42 via a pair of intermediate levers 49, 49' with the object to place the cutter III in the required angular position relative to the ground. As shown in FIG. 8, the cutter can be rotated about the axis of joint 42 by means of a hydraulic actuator 56 which engages a pivot 58 on a lug 57 and has its other end fastened to a pivot mounted on the cutter housing 33.

Figure 9:
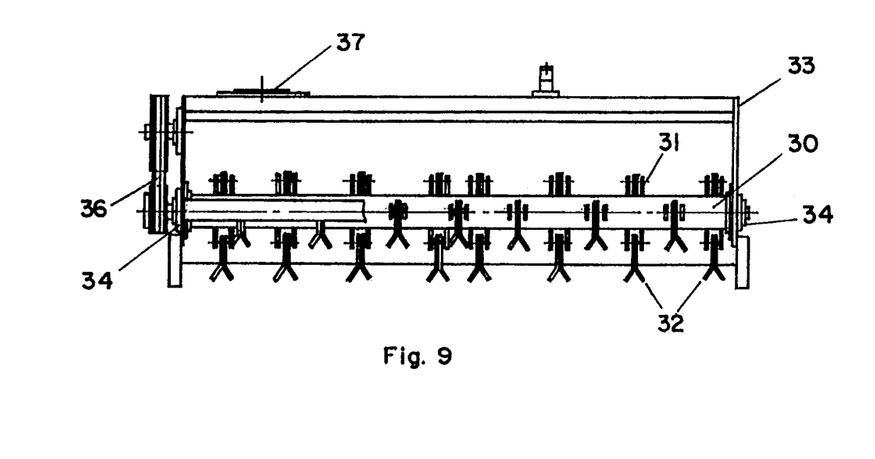
FIG. 9 is a detailed view of the shaft and the blades attached to the shaft of the rotating cutter.
Figure 10:
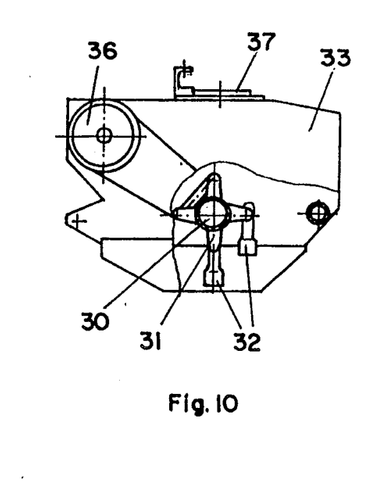
FIG. 10 is a side view of the cutter shown in FIG. 9.
Figure 11:
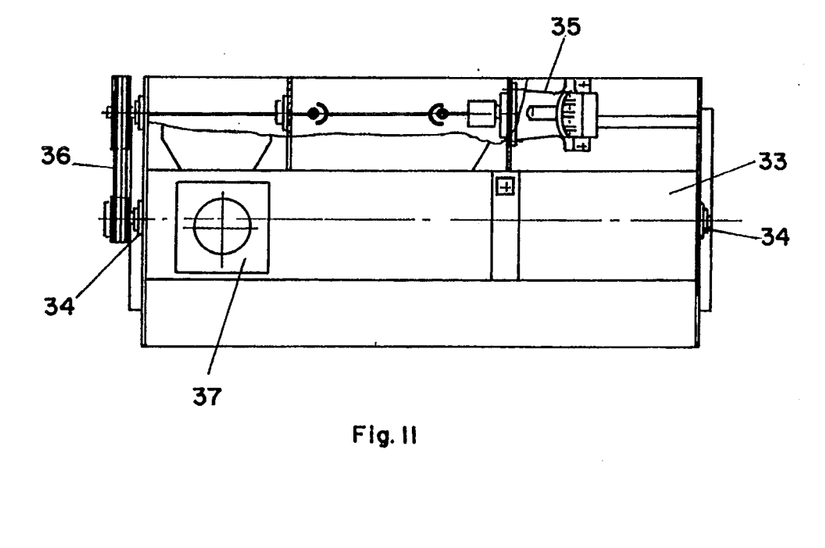
FIG. 11 is a top view of the cutter of FIG. 10.

As shown in FIGS. 9-11, the cutter III comprises mainly a housing 33 containing a rotatable shaft 30 which has a plurality of brackets 31 evenly distributed over its circumference. One pronged cutting tool 32 each is pivotally fastened to each of these brackets 31 and are adapted to swing about its pivot about an angle of 200°. The shaft 33 is mounted in the housing 33 by means of bearings 34 and is rotated by a hydraulic or electric motor 35 (FIG. 11) through a belt drive 36. Housing 33 is connected to the universal joint by a connecting plate 37. The housing 33 covers the top and the sides of the shaft 33, and is open at the bottom and front to permit free access to the brushwork and branches and shrubs or the like which are to be cut and shredded by the rotating cutting tools 32.

The cutting (and shredding) equipment is operated by hydraulic fluid which is stored in a tank 20 and pumped through pipe lines to the motor by a pump 21, see FIGS. 1 and 2, and the pump being driven through the power-take-off shaft of the tractor. The power-take-off shaft is powered by the tractor engine. The movement of arm and cutter is controlled by the driver sitting in the cabin of the tractor by means of a control panel as known in the art. The hydraulic power needed by the cutter is greater than conventionally provided by built-in pumps in tractors; and in the embodiments illustrated herein the hydraulic power is provided by the external pump 21 (see FIGS. 1 and 2).

Figure 12:
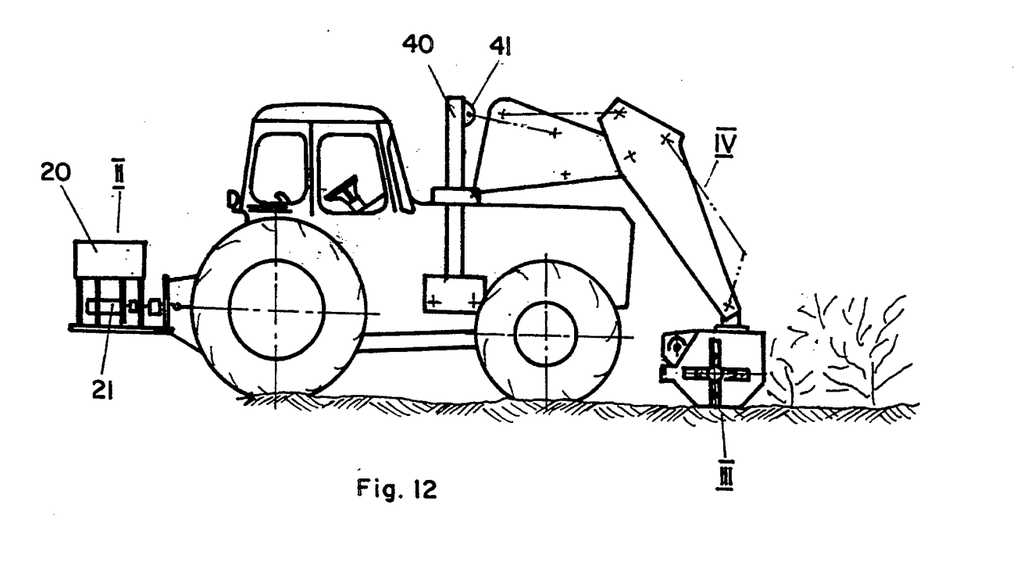
FIG. 12 is a side view of a tractor and the clearing equipment mounted on the top center of the tractor.
Figure 13:
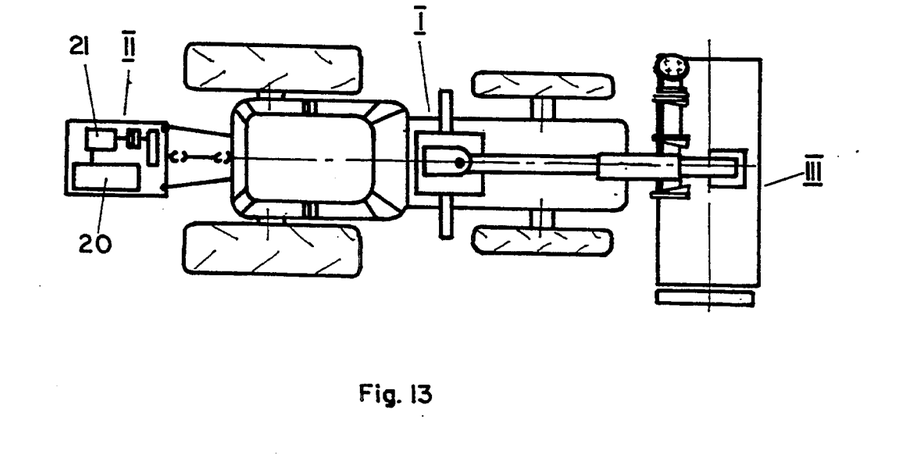
FIG. 13 is a top view of the tractor and equipment of FIG. 12.

FIGS. 12 and 13 illustrate the cutter III in a horizontal position close to the ground held by the arm IV attached to the center of the tractor I by means of a vertical axle 40 and a rotatable bracket 41, permitting angular displacement of the equipment to either side or to the front of the tractor at any angle relative to the tractor traveling direction.

Figure 14:
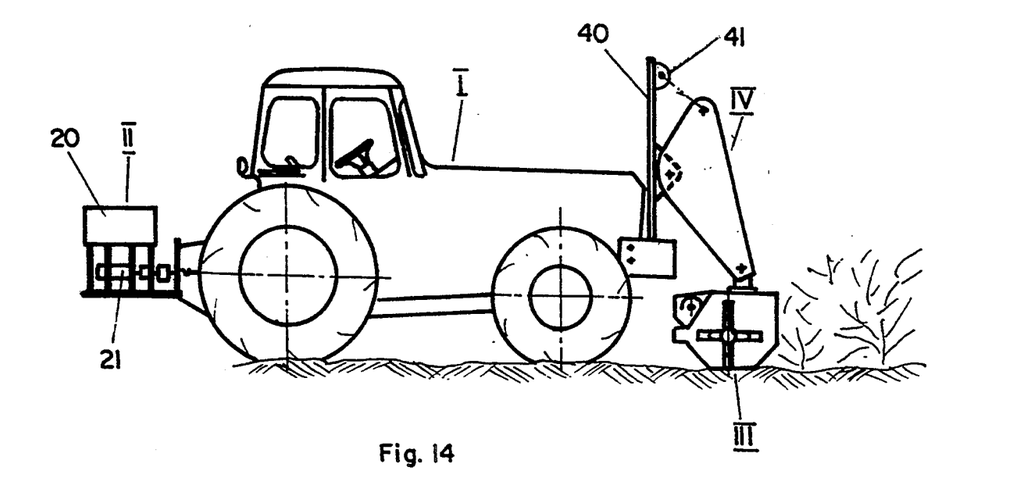
FIG. 14 is a side view of a tractor and the clearing equipment mounted in front of the tractor.
Figure 15:
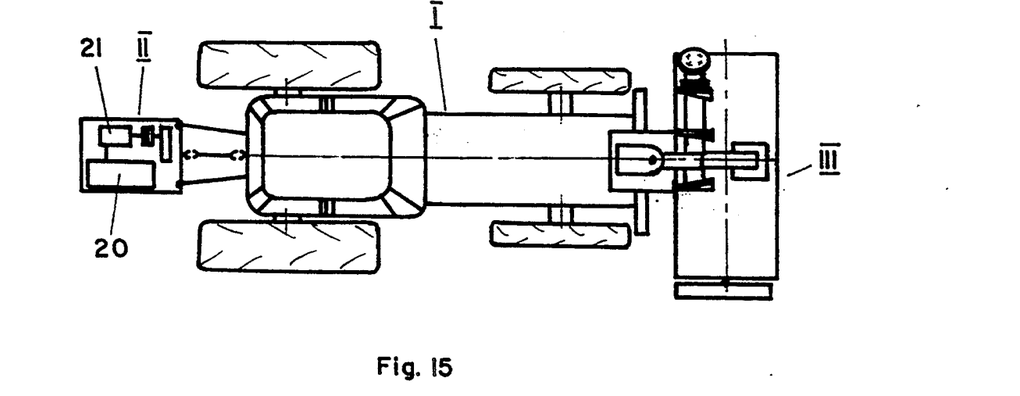
FIG. 15 is a top view of the tractor and equipment of FIG. 14.

FIGS. 14 and 15 illustrate the cutter III in a horizontal position close to the ground held by the arm IV attached to the front of the tractor I by means of a vertical axle 40 and a rotatable bracket 41, permitting angular displacement of the equipment to either side or to the front of the tractor at any angle relative to the tractor traveling direction.

In the foregoing, the clearing equipment has been illustrated and described as being attached to and driven by a standard tractor, but it will be understood that it may constitute a special tool having its carriage specially designed for the task in the way that today's shoveldozers and other earth-moving tools are designed. It is, in this case, not necessary to have the extra hydraulic pumping equipment needed to power the cutting equipment attached to the rear of a tractor, but it may be incorporated in the body and/or in the engine of the tractor itself. The arm IV may include more than two sections, thereby extending its reach and providing the possibility of positioning the cutter in any desired position relative to the tractor, the mutual relative motion and positions of the additional arm sections being controlled by hydraulic actuators similar to those described with reference to the two arm sections 43, 44 shown in the drawings.

Other embodiments of the arm IV and its attachment to the carriage or to the tractor I may be designed by a person skilled in the art as long as the cutter can operate in the way described and clear a way through trees and/or brush and/or shrubs or the like by cutting their branches. It will be understood that the expression "clearing" as used herein includes cutting and/or shredding shrubs (including hedges), brushwork and branches. A tractor is referred to herein. However, it should be clear that the term "tractor" as used herein includes any type of suitable vehicle for carrying the arm IV and cutter III, such as a truck or other suitable vehicle.

I claim:

1. Tree and brush clearing and trimming equipment adapted to be mounted on and operated by an engine driven tractor having an operator's position which is fixed relative to drive wheels of the tractor for cutting and shredding branches of plants during a traveling motion of said tractor, comprising:

a rotary cutter including blades which are pivotally mounted on a rotating shaft, and a housing partially enclosing said rotating shaft and blades, and said housing being open towards the branches to be cut, said rotary cutter including means mounted on said housing for rotating said rotating shaft, said rotary cutter being capable of cutting plants at the front or side of said tractor while said tractor is moving, said rotary cutter being capable of cutting said plants while being moved substantially horizontally in a direction substantially perpendicular to a longitudinal axis of said rotating shaft, and also while moved substantially vertically in a direction substantially perpendicular to the longitudinal axis of said rotating shaft;

an arm coupling said rotary cutter to one of a front portion and a side portion of said tractor, said arm including at least first and second arm sections which are pivotally interconnected at inner ends thereof so as to be angularly disposed in a vertical plane, wherein said first arm section is attached at an outer end thereof to said one of said front portion and side portion of said tractor by a vertical pivot means for permitting positioning of said arm at an angle relative to a direction of travel of said tractor, and by horizonal pivot means for permitting raising and lowering of said arm relative to said tractor and for positioning said rotary cutter at a selected height relative to the ground, and wherein said second arm section is coupled to said rotary cutter at an outer end of said second arm section by means of a joint permitting rotational and angular disposition of the longitudinal axis of said rotating shaft of said rotary cutter relative to said second arm section; and actuator means for changing the relative position of said first and second arm sections and for changing the rotational and angular position of said rotary cutter relative to said second arm section.

2. The equipment of claim 1, wherein said actuator means comprises:

first hydraulic actuator means for changing a relative angular positioning of said at least two arm sections; and second hydraulic actuator means for raising and lowering said first arm section.

3. The equipment of claim 2, wherein said second hydraulic actuator means comprises:

a first hydraulic actuator coupled between said vertical pivot means and said first arm section; and a second hydraulic actuator coupled between said first and second arm section.

4. The equipment of claim 1, wherein said actuator means comprises a hydraulic actuator for revolving said arm about said vertical pivot.

5. The equipment of claim 1, wherein:

said joint coupling said rotary cutter to said second arm section comprises a bearing permitting turning of said rotary cutter about a right angle; and said actuator means includes a hydraulic actuator coupled to said second arm section for moving said rotary cutter relative to said second arm section about said joint.

6. The equipment of claim 5, wherein:

said joint is attached to the outer end of said second arm section and includes means for permitting angular adjustment between said arm and said rotary cutter; and further comprising a further hydraulic actuator for angularly moving said rotary cutter relative to said arm.

7. The equipment of claim 6, wherein said means for permitting said angular adjustment between said arm and said rotary cutter comprises a horizontal pivot.

8. The equipment of claim 1, wherein said means for rotating said rotating shaft comprises a motor mounted on said housing.

9. The equipment of claim 1, wherein a belt drive is coupled between said motor and said rotating shaft to rotate said rotating shaft by said motor.

10. The equipment of claim 8, wherein said motor comprises a hydraulic motor.

11. The equipment of claim 10, further comprising hydraulic pumping means, on said tractor and separate from the engine of said tractor, for supplying hydraulic power to said hydraulic motor.

12. The equipment of claim 11, wherein said hydraulic pumping means is coupled to a rear portion of said tractor.

13. The equipment of claim 12, further comprising drive means coupling said hydraulic pumping means to a power take-off shaft of the engine which drives said tractor.

14. The equipment of claim 11, further comprising drive means coupling said hydraulic pumping means to a power take-off shaft of the engine which drives said tractor.

15. The equipment of claim 1, wherein said first arm section is coupled to said side portion of said tractor intermediate front and rear drive wheels of said tractor.

16. The equipment of claim 1, wherein said first arm section is coupled to the front end portion of said tractor.

17. The equipment of claim 1, wherein said first arm section is coupled to a center portion at said front portion of said tractor.

18. The equipment of claim 16, wherein said first arm section is coupled to said tractor substantially along a longitudinal center line of said tractor.

19. The equipment of claim 17, wherein said first arm section is coupled to said tractor substantially along a longitudinal center line of said tractor.

20. The equipment of claim 1, wherein said first arm section is coupled to said tractor substantially along a longitudinal center line of said tractor.

21. The equipment of claim 1, wherein said rotary cutter has a width, in the direction of said rotating shaft, which is at least substantially equal to the maximum width of said tractor.

22. The equipment of claim 16, wherein said rotary cutter has a width, in the direction of said rotating shaft, which is at least substantially equal to the maximum width of said tractor.

* * * * *